United States Patent

[11] 3,603,948

| [72] | Inventor | William W. Medlinski<br>Clifton, N.J. |
|---|---|---|
| [21] | Appl. No. | 778,271 |
| [22] | Filed | Nov. 22, 1968 |
| [45] | Patented | Sept. 7, 1971 |
| [73] | Assignee | The Bendix Corporation |

[54] FAULT IDENTIFICATION, ISOLATION AND DISPLAY FOR USE WITH AN AIRCRAFT CONTROL SYSTEM
8 Claims, 1 Drawing Fig.

[52] U.S. Cl. .................................................. 340/214, 340/27
[51] Int. Cl. .................................................. G08b 23/00
[50] Field of Search .................................................. 340/214, 213, 27, 210, 411; 244/77 M; 73/178

[56] References Cited
UNITED STATES PATENTS

| 2,917,731 | 12/1959 | Rogers | 340/213 |
| 3,252,675 | 5/1966 | Close et al. | 244/77 |
| 3,439,321 | 4/1969 | Sebern | 340/27 |
| 3,454,849 | 7/1969 | Kirchhein et al. | 318/18 |
| 3,505,641 | 4/1970 | Boskovich | 340/27 |

*Primary Examiner*—Alvin H. Waring
*Attorneys*—Anthony F. Cuoco and Plante, Hartz, Smith and Thompson ABSTRACT: A fault identification, isolation and display device for testing an aircraft control system. The device senses malfunctions in selected portions of the system and provides a visual display which instantaneously identifies and isolates the malfunctioning section and memorizes the fault status of the section until the device is manually or automatically reset.

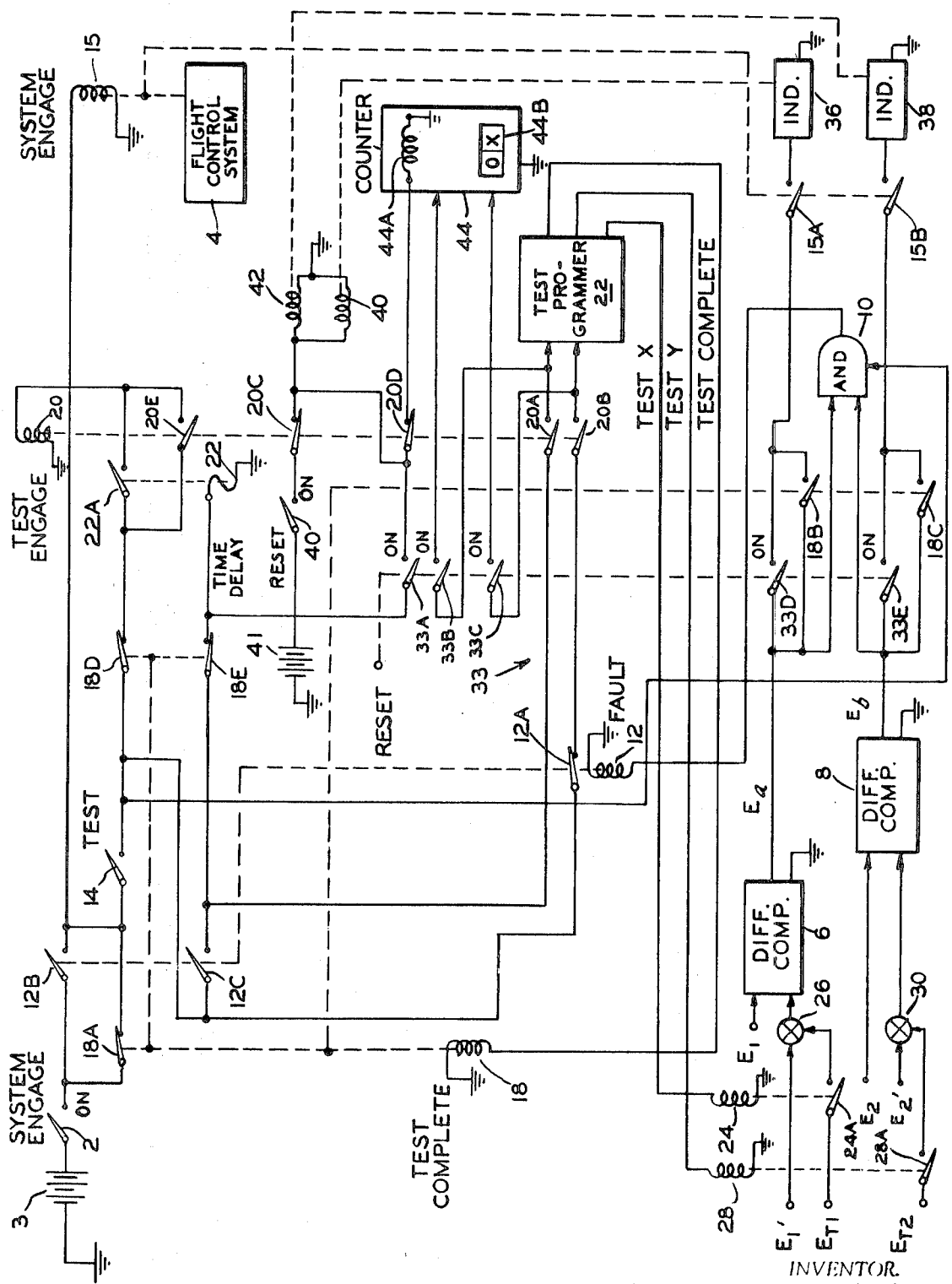
INVENTOR.
WILLIAM W. MEDLINSKI
ATTORNEY

FAULT IDENTIFICATION, ISOLATION AND DISPLAY FOR USE WITH AN AIRCRAFT CONTROL SYSTEM

BACKGROUND OF THE INVENTION

1. Field of the Invention

This invention relates to apparatus for identifying, displaying and storing failures which occur in a monitored aircraft control system.

2. Description of the Prior Art

Control systems for present day aircraft have reached a high degree of sophistication and, as a result, trouble shooting and maintenance to overcome system malfunctions is a problem. Practical limitations on system monitors often cause nuisance failures (failures which do not adversely affect the system) to occur and it is difficult to discriminate between the nuisance failures and real failures. The device of the present invention alleviates these problems by displaying and storing actual or nuisance failures and clearing nuisance failures from the display when subsequent testing is initiated.

SUMMARY OF THE INVENTION

The present invention is used with a monitored flight control system of the type including comparators for comparing redundant signals from various sections of the system. The system is disconnected when any one of the comparators senses a threshold differential between the compared signals, and which threshold differential indicates a malfunction in the corresponding section of the system. When the system is not undergoing an automatic test sequence, system malfunctions are identified, displayed and stored and, if desired, nuisance alarms are automatically cleared from displays. During an automatic test sequence an events counter indicates the steps of a test program so that each time a test event is completed the counter advances one step. If a failure occurs during testing, the counter will not advance and the failure is recorded on an indicator. The fault display plus the counter position isolates the malfunctioning section of the control system.

The main object of this invention is to provide means for identifying, displaying and storing malfunctions which occur in a flight control system during operation and test.

Another object of this invention is to provide means for "on-line" testing of redundant sections of the control system and for disconnecting the system if any of the redundant sections malfunction.

Another object of this invention is to isolate system malfunctions.

Another object of this invention is to automatically clear the display means of nuisance failures.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWING

The single FIGURE of the drawing is an electrical schematic diagram of a device according to the invention.

DESCRIPTION OF THE INVENTION

When a system engage switch 2 is closed to the "on" position, the output from a suitable source of direct current shown as a battery 3 energizes a system engage relay 15 as will be hereinafter explained, and which relay 15 is coupled to a flight control system designated generally by the numeral 4 for engaging control system 4 in a monitored configuration. System engage relay 15 has a pair of normally open contacts 15A and 15B.

A differential comparator 6 compares corresponding signals $E_1$ and $E_1'$ from redundant sections of flight control system 4 and a differential comparator 8 compares corresponding signals $E_2$ and $E_2'$ from other redundant sections of system 4. If the difference between signals $E_1$ and $E_1'$ is less than a predetermined threshold, a voltage $E_a$ appears at the output of differential comparator 6, and if the differential between signals $E_2$ and $E_2'$ is less than a predetermined threshold, a voltage $E_b$ appears at the output of differential comparator 8. Comparators 6 and 8 are connected to an AND gate 10. If outputs $E_a$ and $E_b$ appear simultaneously and AND gate 10 receives the output from battery 3 applied through closed switch 2, a normally closed contact 18A or relay 18 and a test switch 14 which is manually or automatically closed, AND gate 10 provides an output for energizing a fault relay 12. Fault relay 12 has a normally closed contact 12A and a pair of normally open contacts 12B and 12C. Relay 18 has, additionally, a pair of normally open contacts 18B and 18C and a pair of normally closed contacts 18D and 18E. If the difference between voltages $E_1$ and $E_1'$ or the difference between voltages $E_2$ and $E_2'$ exceeds the respective predetermined thresholds, voltages $E_a$ and/or $E_b$ will not appear and fault relay 12 deenergizes.

When fault relay 12 is energized, normally closed contact 12A thereof opens and normally open contacts 12B and 12C close. The output from battery 3 is applied through closed system engage switch 2, closed contact 18A, closed test switch 14 and closed contacts 12C and 18E to a time delay relay 22 for energizing relay 22 and for closing a normally open contact 22A thereof.

The output from battery 3 is applied through closed system engage switch 2, closed contact 18A, closed test switch 14 and closed contacts 18D and 22A for energizing a test engage relay 20 and for closing normally open contacts 20A, 20B and 20E thereof and for opening normally closed contacts 20C and 20D of test relay 20.

The output from battery 3 is applied through closed system engage switch 2, closed test switch 14 and closed contacts 18A, 12C and 20A to a test programmer 22 which may be, for purposes of example, programmed for a test X—test Y—test complete test program. Test programmer 22 responds to the output from battery 3 to provide a test X output for energizing a relay 24 having a normally open contact 24A. Contact 24A closes and a test voltage $E_{T1}$ is applied therethrough to a summing means 26 which sums voltages $E_1'$ and $E_{T1}$. Comparator 6 compares voltage $E_1$ and the summation voltage and, since the difference between the compared voltages exceeds the predetermined threshold of comparator 6, voltage $E_a$ will disappear and fault relay 12 deenergizes. Closed contact 12C of relay 12 opens and the voltage from battery 3 is applied through closed system engage switch 2, closed contact 18A, closed test switch 14 and closed contacts 12A and 20B to programmer 22.

Programmer 22 responds by removing test X voltage which deenergizes relay 24. Contact 24A opens, test voltage $E_{T1}$ is removed, voltage $E_a$ reappears at the output of comparator 6 and fault relay 12 is again energized. Test programmer 22 responds to the output applied thereto from battery 3 as heretofore noted for providing test Y voltage which energizes a relay 28. Normally open contact 28A of relay 28 closes and a test voltage $E_{T2}$ is applied therethrough to a summing means 30 which sums voltages $E_{T2}$ and $E_2'$. Comparator 8 compares voltage $E_2$ and summation voltage, and since the difference between the compared voltages exceeds the threshold of comparator 8, voltage $E_b$ will disappear and fault relay 12 deenergizes. These programmer 22 responds by removing test Y voltage to deenergize relay 28. Contact 28A opens, test voltage $E_{T2}$ is removed, voltage $E_b$ reappears and fault relay 12 energizes. In a manner similar to that heretofore explained, programmer 22 provides a test complete voltage for energizing test complete relay 18. Contacts 18A, 18D and 18E of test complete relay open and contacts 18B and 18C close. Relay 18 latches in the energized state and the test sequence is completed. Open contacts 18A and 18D disconnect battery 3 from time delay 22 causing relay 22 to deenergize which in turn deenergizes test engage relay 20 to open contacts 20A and 20B thereof for inhibiting further operation of test programmer 22. It will thus be seen that flight control system 4 is engaged in the monitored configuration by contact 12B of energized relay 12 being closed, and whereby the output from battery 3 energizes relay 15 which engages the system. Any subsequent system malfunction results in a threshold differential at the inputs to comparators 6 and/or 8 which deenergizes fault relay 12 to open contact 12B and to disconnect system 4.

The foregoing description refers to a monitored control system having two distinct phases; namely, "automatic test" and "on-line". The "on-line" phase signifies that comparators 6 and 8 are active and will disconnect the system if any of the redundant system sections malfunction.

The fault isolation feature of the present invention is implemented by adding a reset switch designated generally by the numeral 33 and having normally open ganged contacts 33A, 33B, 33C, 33D and 33E. Contact 33A connects contact 18E of test complete relay 18 to a reset coil 44A of a counter 44, contacts 33B and 33C connect test programmer 22 to counter 44 and contacts 33D and 33E connect comparator 6 and comparator 8 to indicators 36 and 38 through contacts 15A and 15B of system engage relay 15, respectively.

Counter 44 is a conventional-type events counter which is used during automatic testing to indicate the steps of the test program provided by programmer 22. It will be shown that each time fault relay 12 energizes or deenergizes, counter 44 advances one step. If the system does not respond or responds incorrectly, the test is discontinued and counter 44 indicates which test step was in progress on a readout 44B whereat test step X is shown in the drawing for purposes of illustration. Since the test program and the step at which failure occurs are known, the failure is isolated. Counter 44 will retain this readout until reset coil 44A resets counter 44.

Indicators 36 and 38 are of a conventional type which latch when energized and display a flag or some other annunciation in the latched state. Once latched, indicators 36 and 38 remains so even if power is removed. Indicators 36 and 38 are rest by applying a voltage to appropriate relays 40 and 42 as will be hereinafter seen.

When reset switch 33 is in the "off" position and contacts 33A, 33B, 33C, 33D and 33E are open as shown in the drawing, all "on-line" malfunctioning sections of the system and nuisance alarms are displayed on indicators 36 and 38 indefinitely. Indicators 36 and 38 are reset by manually closing a reset switch 41 to the "on" position whenever the system is not undergoing automatic testing. This applies a voltage from a suitable source of direct current shown as a battery 41 to relays 40 and 42, and which relays 40 and 42 are thereby energized for resetting indicators 36 and 38, respectively. When reset switch 40 and contacts 33A, 33B, 33C, 33D and 33E of reset switch 33 are in the "on" position, counter 44 is active during tests and both counter 44 and indicators 36 and 38 are automatically reset, provided fault relay 12 is energized indicating no system malfunctions and comparators 6 and 8 are not "on-line."

When contacts 33A, 33B, 33C, 33D and 33E of reset switch 33 are in the "off" position, and assuming both indicators 36 and 38 are off (unlatched), upon the completion of a successful test program test complete relay 18 is energized and contacts 18D and 18E thereof close. Any subsequent malfunction causes an appropriate indicator 36 or 38 to latch so that the indicators store indefinitely the information which identifies the malfunctioning section. Indicators 36 and 38 are reset by manually closing reset switch 41 as heretofore noted.

When contacts 33A, 33B, 33C, 33D and 33E of reset switch 33 are in the "on" position and it is assumed that indicator 44B of counter 44 is indicating a step from a previous test and that indicator 36 is storing a nuisance alarm, if fault relay 12 is energized and test switch 14 is closed, counter 44 resets to zero before time delay relay 22 energizes. Once relay 22 energizes, test engage relay 20 energizes as heretofore noted which in turn opens the path to reset coil 44A of counter 44. At the same time that counter 44 is reset, indicators 36 and 38 are reset, and with test engage relay 20 and fault relay 12 both energized counter 44 advances to indicate the first step of the test program and testing begins. In the first test step fault relay 12 is deenergized by the application of test voltage $E_{T1}$, indicator 36 latches and counter 44 advances to a second program step whereupon fault relay 12 deenergizes. Contact 12A closes causing test programmer 22 to deenergize relay 24 to remove voltage $E_{T1}$. With voltage $E_{T1}$ removed, fault relay 12 deenergizes, which in turn advances counter 44 to a third test step and resets indicator 36. Test programmer 22 energizes relay 28, indicator 38 latches and fault relay 12 deenergizes thereby advancing counter 44 to a fourth test step. Fault relay 12 also causes test programmer 22 to deenergize relay 28 which removes test voltage $E_{T2}$ and fault relay 12 reenergizes. At this time counter 44 is advanced to a fifth test step, indicator 38 resets and test complete relay 18 is energized by programmer 22. With test complete relay 18 energized, automatic reset of indicators 36 and 38 is prevented, test engage relay 20 is deenergized and as a result test programmer 22 and counter 44 are disabled. Any subsequent system failures, nuisance or real, will latch the appropriate indicators and flight control system 4 will be disconnected.

If a test cycle is started and a system failure occurs which is detected by one of the comparators 6 or 8, fault relay 12 will not energize and the appropriate indicators 36 or 38 will latch. Since fault relay 12 is deenergized, test programmer 22 is inhibited from operating. If a test cycle is started and a system failure exists which is not detectable by one of the comparators 6 or 8; e.g., a comparator failure; the test cycle will start. However, when the malfunctioning comparator is tested it will not respond and the test program will stop, causing counter 44 to indicate the malfunctioning step in the sequence.

It is to be noted that if, during on-line operation, unusually large signals are impressed on flight control system 4, some of the circuitry will operate in a nonlinear region. As a result, a differential greater than the predetermined threshold exists at the input to one of the comparators 6 and 8 and one of the indicators 36 and 38 will latch. During the next automatic test cycle, this indicator will be automatically reset since the spurious fault no longer exists.

It will now be evident that in order to fulfill the intent of the invention both programmer 22 and indicators 36 and 38 are necessary. For example, the program may require that at a particular step indicator 36 should show a fault as may be the case where the program provides for checking comparator 8. If both indicators 36 and 38 show a fault, it is obvious that comparator 8 is not functioning properly and if no fault is indicated the fault lies with comparator 6.

It may be seen from the aforegoing description of the invention that resetting of counter 44 or indicators 36 and 38 is dependent on fault relay 12 being energized, and fault relay 12 will only energize when the system is fault free. If the fault is not detectable by the comparators, counter 44 will indicate the source of the failure during the test program.

Thus, the invention provides means for visually annunciating the malfunctioning section of a monitored control system. The annunciation is stored indefinitely and is automatically cleared of nuisance alarms.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Test apparatus for a control system having at least two sections, each of which provides a pair of redundant signals, comprising:

at least two comparators, each of which is connected to a corresponding control system section for comparing the redundant signals therefrom and for providing an output corresponding to the difference therebetween;

means for providing a control system engage signal;

gating means connected to the control system engage signal means and to the comparators and responsive to the system engage signal and the outputs from the comparators for providing a signal at one logic level when the outputs are below a predetermined level and for providing a signal at another logic level when at least one of said outputs is above the predetermined level;

first switching means connected to the gating means, to the system engage signal means and to the control system, and responsive to the gating mans output at the one logic level for applying the system engage signal to the control system to engage the system, and responsive to the gating means output at the other logic level for removing the system engage signal from the control system to disengage the system;

means for providing test signals; and signal applying means connected to the system engage signal means, to the comparators and to the test signal means, and responsive to the system engage signal when the control system is initially engaged for applying the test signals to and for removing the test signals from the comparators in accordance with a predetermined test sequence.

2. Test apparatus as described by claim 1, including:

means connected to the system engage signal means and to the signal applying means for rendering the signal applying means unresponsive to the system engage signal when the test sequence is completed so as to inhibit operation of said signal applying means.

3. Test apparatus as described by claim 1, including:

indicating means connected to the comparators and responsive to the one output above the predetermined level for indicating a system failure.

4. Test apparatus as described by claim 3, including:

second switching means connected to the system engage signal means, the comparators and the signal applying means;

said second switching means responsive to the outputs from the comparators below the predetermined level for applying the system engage signal to the signal applying means, and responsive to the one comparator output above the predetermined level for removing the system engage signal from the signal applying means; and the signal applying means being effective to advance a step in the test sequence each time the system engage signal is applied thereto and removed therefrom.

5. Test apparatus as described by claim 4, including:

a counter;

third switching means manually operable for connecting the counter intermediate the signal applying means and the second switching means;

the third switching means being operable for applying and removing the system engage signal to and from the counter each time said signal is applied to and removed from the signal applying means by the second switching means; and the counter being effective to advance a step in the test sequence each time the system engage signal is applied thereto and removed therefrom, and to indicate said test step.

6. Test apparatus as described by claim 5, including:

means for providing a reset signal;

fourth switching means manually operable for connecting the reset signal means to the indicating means;

fifth switching means connected to the system engage signal means and connected intermediate the fourth switching means and the indicating means; and said fifth switching means being responsive to the system engage signal for applying the reset signal to the indicating means when the fourth switching means is operated.

7. Test apparatus as described by claim 6, wherein:

the fourth switching means is manually operable for connecting the reset signal means to the counter;

the fifth switching means is connected to the system engage signal means and is connected intermediate the fourth switching means and the counter; and said fifth switching means is responsive to the system engage signal for applying the reset signal to the counter when the fourth switching means is operated.

8. Test apparatus as described by claim 3, including:

sixth switching means connected intermediate the comparators and the indicating means and connected to the signal applying means; and said sixth switching means being effective upon completion of the test sequence for disconnecting the comparators from the indicating means.